(12) United States Patent
Bae et al.

(10) Patent No.: US 10,503,828 B2
(45) Date of Patent: Dec. 10, 2019

(54) SYSTEM AND METHOD FOR ANSWERING NATURAL LANGUAGE QUESTION

(71) Applicant: Electronics and Telecommunications Research Institute, Daejeon (KR)

(72) Inventors: Yong Jin Bae, Daejeon (KR); Hyun Ki Kim, Daejeon (KR); Pum Mo Ryu, Daejeon (KR); Hyo Jung Oh, Daejeon (KR); Chung Hee Lee, Daejeon (KR); Soo Jong Lim, Daejeon (KR); Joon Ho Lim, Daejeon (KR); Myung Gil Jang, Daejeon (KR); Mi Ran Choi, Daejeon (KR); Jeong Heo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 441 days.

(21) Appl. No.: 14/737,130

(22) Filed: Jun. 11, 2015

(65) Prior Publication Data

US 2016/0140187 A1 May 19, 2016

(30) Foreign Application Priority Data

Nov. 19, 2014 (KR) .......................... 10-2014-0161904

(51) Int. Cl.
*G06F 17/30* (2006.01)
*G06F 17/27* (2006.01)
(Continued)

(52) U.S. Cl.
CPC ........ *G06F 17/271* (2013.01); *G06F 16/3329* (2019.01); *G06F 16/3332* (2019.01); *G06F 16/36* (2019.01); *G06F 17/2785* (2013.01)

(58) Field of Classification Search
CPC ............... G06F 17/271; G06F 17/2785; G06F 17/30011; G06F 17/30321;
(Continued)

(56) References Cited

U.S. PATENT DOCUMENTS 5,704,060 A * 12/1997 Del Monte ............. H03M 7/30
6,078,913 A *  6/2000 Aoki .................. G06F 17/30864
6,366,908 B1    4/2002 Chong et al.
(Continued)

FOREIGN PATENT DOCUMENTS

KR   1020020072092 A   9/2002
KR   1020060067129 A   6/2006
KR   1020110114055 A   10/2011

OTHER PUBLICATIONS

Retrieval effectiveness of an ontology-based model for information selection, Khan et al., (Year: 2003).*

*Primary Examiner* — Jean M Corrielus
(74) *Attorney, Agent, or Firm* — William Park & Associates Ltd.

(57) ABSTRACT

Provided are a system and method for answering a natural language question which show improved information retrieval performance. The system includes an index unit configured to analyze text of previously stored irregular documents and classify and index the irregular documents according to meanings of sentences or paragraphs, a database configured to receive and store the irregular documents indexed according to the meanings and transmitted from the index unit, a retrieval unit configured to extract an index word by semantically analyzing an input question and search the database for documents related to the extracted index word, and a provision unit configured to generate a correct answer to the question by analyzing the documents searched by the retrieval unit and provide the search results and the correct answer.

16 Claims, 10 Drawing Sheets

(51) Int. Cl.
*G06F 16/36* (2019.01)
*G06F 16/33* (2019.01)
*G06F 16/332* (2019.01)

(58) Field of Classification Search
CPC ......... G06F 17/30401; G06F 17/30554; G06F 17/30598; G06F 16/3329; G06F 16/3332; G06F 16/36
USPC ....................................................... 707/722
See application file for complete search history.

(56) References Cited

U.S. PATENT DOCUMENTS

| | | | |
|---|---|---|---|
| 6,947,923 | B2 | 9/2005 | Cha et al. |
| 7,428,487 | B2* | 9/2008 | Wang ................ G06F 17/30716 704/10 |
| 7,672,831 | B2* | 3/2010 | Todhunter ........... G06F 17/2785 704/4 |
| 8,332,394 | B2* | 12/2012 | Fan ........................... G06N 5/02 707/723 |
| 8,554,540 | B2* | 10/2013 | Lee .................... G06F 17/30654 703/27 |
| 8,768,925 | B2* | 7/2014 | Brown .............. G06F 17/30654 707/736 |
| 2003/0101182 | A1* | 5/2003 | Govrin .................. G06F 16/951 |
| 2005/0086222 | A1* | 4/2005 | Wang ................ G06F 17/30716 |
| 2007/0073533 | A1* | 3/2007 | Thione .................. G06F 17/279 704/9 |
| 2007/0094006 | A1* | 4/2007 | Todhunter ........... G06F 17/2785 704/8 |
| 2007/0112555 | A1* | 5/2007 | Lavi ...................... G06F 17/277 704/9 |
| 2007/0203885 | A1 | 8/2007 | Kim et al. |
| 2009/0292687 | A1* | 11/2009 | Fan .......................... G06N 5/02 |
| 2010/0057708 | A1* | 3/2010 | Billingsley ............. G06F 17/30 707/E17.001 |
| 2010/0153094 | A1* | 6/2010 | Lee .................... G06F 17/30654 704/9 |
| 2011/0246505 | A1* | 10/2011 | Jung ...................... G06F 16/148 707/769 |
| 2011/0252065 | A1 | 10/2011 | Ryu et al. |
| 2012/0229872 | A1* | 9/2012 | Dolev ..................... G06F 21/64 358/448 |
| 2013/0007033 | A1* | 1/2013 | Brown .............. G06F 17/30654 707/764 |
| 2013/0275462 | A1* | 10/2013 | Jung ...................... G06F 16/148 707/769 |
| 2014/0258286 | A1* | 9/2014 | Brown .............. G06F 17/30654 707/728 |

* cited by examiner

FIG. 3A

| | |
|---|---|
| TEXT | 앞서 1일 중국 최대 전자상거래업체 알리바바는 회사 공식 블로그를 통해 지문인식 경제 시스템을 준비하고 있다고 밝혔다. |
| Morp | { "id" : 0, "lemma" : "앞서", "type" : "VV", "position" : 1}<br>{ "id" : 1, "lemma" : "어", "type" : "EC", "position" : 4}<br>{ "id" : 2, "lemma" : "1", "type" : "SN", "position" : 8}<br>{ "id" : 3, "lemma" : "일", "type" : "NNB", "position" : 9}<br>{ "id" : 4, "lemma" : "중국", "type" : "NNG", "position" : 13}<br>{ "id" : 5, "lemma" : "최대", "type" : "NNG", "position" : 20}<br>{ "id" : 6, "lemma" : "전자상거래", "type" : "NNG", "position" : 27}<br>{ "id" : 7, "lemma" : "업체", "type" : "NNG", "position" : 42}<br>{ "id" : 8, "lemma" : "알리바바", "type" : "NNP", "position" : 49}<br>{ "id" : 9, "lemma" : "는", "type" : "JX", "position" : 61}<br>{ "id" : 10, "lemma" : "회사", "type" : "NNG", "position" : 65}<br>{ "id" : 11, "lemma" : "공식", "type" : "NNG", "position" : 72}<br>{ "id" : 12, "lemma" : "블로그", "type" : "NNG", "position" : 79}<br>{ "id" : 13, "lemma" : "를", "type" : "JKO", "position" : 88}<br>{ "id" : 14, "lemma" : "통하", "type" : "VV", "position" : 92}<br>{ "id" : 15, "lemma" : "아", "type" : "EC", "position" : 95}<br>{ "id" : 16, "lemma" : "지문", "type" : "NNG", "position" : 99}<br>{ "id" : 17, "lemma" : "인식", "type" : "NNG", "position" : 105}<br>{ "id" : 18, "lemma" : "경제", "type" : "NNG", "position" : 112}<br>{ "id" : 19, "lemma" : "시스템", "type" : "NNG", "position" : 119}<br>{ "id" : 20, "lemma" : "을", "type" : "JKO", "position" : 128}<br>{ "id" : 21, "lemma" : "준비", "type" : "NNG", "position" : 132}<br>{ "id" : 22, "lemma" : "하", "type" : "XSV", "position" : 138}<br>{ "id" : 23, "lemma" : "고", "type" : "EC", "position" : 141}<br>{ "id" : 24, "lemma" : "있", "type" : "VX", "position" : 145}<br>{ "id" : 25, "lemma" : "다고", "type" : "EC", "position" : 148}<br>{ "id" : 26, "lemma" : "밝히", "type" : "VV", "position" : 155}<br>{ "id" : 27, "lemma" : "었", "type" : "EP", "position" : 158}<br>{ "id" : 28, "lemma" : "다", "type" : "EF", "position" : 161}<br>{ "id" : 29, "lemma" : ".", "type" : "SF", "position" : 164} |
| Ne | { "id" : 0, "text" : "1일", "type" : "DT_DAY", "type" : DT_DAY", "begin" : 2", "end" : 3}<br>{ "id" : 1, "text" : "중국", "type" : "LCP_COUNTRY", "type" : LCP_COUNTRY", "begin" : 4", "end" : 4}<br>{ "id" : 2, "text" : "알리바바", "type" : "OGG_BUSINSS", "type" : OGG_BUSINSS", "begin" : 8", "end" : 8}<br>{ "id" : 3, "text" : "블로그", "type" : "TMI_SERVICE", "type" : TMI_SERVICE", "begin" : 12", "end" : 12} |
| Chunk | { "id" : 0, "text" : "앞서어", "type" : "VP", "begin" : 0, "end" : 1}<br>{ "id" : 1, "text" : "1일", "type" : "NP", "begin" : 2, "end" : 3}<br>{ "id" : 2, "text" : "중국 최대 전자상거래업체 알리바바는", "type" : "NP", "begin" : 4, "end" : 9}<br>{ "id" : 3, "text" : "회사 공식 블로그를 통하아", "type" : "NP", "begin" : 10, "end" : 15}<br>{ "id" : 5, "text" : "준비하고 있다고 밝히었다", "type" : "VPC", "begin" : 21, "end" : 29} |

FIG. 3B

| | |
|---|---|
| Dependency | { "id" : 0, "text" : "앞서", "head" : 9, "label" : "VP", "mod" : [ ]}<br>{ "id" : 1, "text" : "1일", "head" : 9, "label" : "NP_AJT", "mod" : [ ]}<br>{ "id" : 2, "text" : "중국", "head" : 3, "label" : "NP", "mod" : [ ]}<br>{ "id" : 3, "text" : "최대", "head" : 4, "label" : "NP", "mod" : [ ]}<br>{ "id" : 4, "text" : "전자상거래업체", "head" : 5, "label" : "NP", "mod" : [ ]}<br>{ "id" : 5, "text" : "알리바바는", "head" : 9, "label" : "NP_SBJ", "mod" : [ ]}<br>{ "id" : 6, "text" : "회사", "head" : 7, "label" : "NP", "mod" : [ ]}<br>{ "id" : 7, "text" : "공식", "head" : 8, "label" : "NP", "mod" : [ ]}<br>{ "id" : 8, "text" : "블로그를", "head" : 9, "label" : "NP_OBJ", "mod" : [ ]}<br>{ "id" : 9, "text" : "통해", "head" : 13, "label" : "VP", "mod" : [ ]}<br>{ "id" : 10, "text" : "지문인식", "head" : 12, "label" : "NP", "mod" : [ ]}<br>{ "id" : 11, "text" : "경제", "head" : 12, "label" : "NP", "mod" : [ ]}<br>{ "id" : 12, "text" : "시스템을", "head" : 13, "label" : "NP_OBJ", "mod" : [ ]}<br>{ "id" : 13, "text" : "준비하고", "head" : 14, "label" : "VP", "mod" : [ ]}<br>{ "id" : 14, "text" : "있다고", "head" : 15, "label" : "VP_CMP", "mod" : [ ]}<br>{ "id" : 15, "text" : "밝혔다.", "head" :-1, "label" : "VP", "mod" : [ ]} |

FIG. 3C

| | |
|---|---|
| SRL | `{ "verb" : "통하", "sense" : 1, "word_id : 9, "weight" : 23.0288, "argument" : [`<br>`  {"type" : "ARG0", "word_id" : 5, "text" : "알리바바는}`<br>`  {"type" : "ARG2", "word_id" : 8, "text" : "블로그를}`<br>`]`<br>`}`<br>`{ "verb" : "준비", "sense" : 1, "word_id : 13, "weight" : 23.0288, "argument" : [`<br>`  {"type" : "ARG-TMP", "word_id" : 0, "text" : "앞서}`<br>`  {"type" : "ARG-TMP", "word_id" : 1, "text" : "1일}`<br>`  {"type" : "ARG0", "word_id" : 5, "text" : "알리바바는}`<br>`  {"type" : "ARGM-INS, "word_id" : 9, "text" : "통해}`<br>`  {"type" : "ARG1", "word_id" : 12, "text" : "시스템을}`<br>`  {"type" : "AUX", "word_id" : 14, "text" : "있다고}`<br>`]`<br>`}`<br>`{ "verb" : "밝히", "sense" : 1, "word_id : 15, "weight" : 23.0288, "argument" : [`<br>`  {"type" : "ARGM-TMP", "word_id" : 0, "text" : "앞서}`<br>`  {"type" : "ARG1", "word_id" : 14, "text" : "있다고}`<br>`]`<br>`}` |

FIG. 4

| Chosun Biz | EVOLUTION OF MOBILE PAYMENT···<br>PAYMENT TECHNOLOGY USING FINGERPRINT AND IRIS |
|---|---|
| | ARTICLE INPUT 2014-09-13 06.31 ARTICLE ORIGINALLY |

AS IT COMPANIES INCLUDING APPLE, ALIBABA, ETC.
RELEASE BIOMETRIC PAYMENT TOOLS USING A FINGER, AN IRIS, ETC.
IN SUCCESSION, NEW MOBILE PAYMENT METHODS ARE ATTRACTING ATTENTION.

"APPLEPAY" REVEALED IN APPLE'S NEW PRODUCT SHOW ON NINTH (LOCAL TIME)
IS A FINGERPRINT-RECOGNITION PAYMENT TOOL IN WHICH PAYMENT IS FINISHED
BY TOUCHING THE SCREEN OF A SMART PHONE WITH A FINGER. APPLE PROVIDES
APPLEPAY EQUIPPED WITH A NEAR FIELD COMMUNICATION (NFC) CHIP AND
THE FINGERPRINT RECOGNITION TECHNOLOGY "TOUCH ID" FROM THE NEXT MONTH.
ALSO, APPLE FORMED PARTNERSHIP WITH AMERICAN EXPRESS, MASTERCARD,
THE CAR-SHARING APPLICATION (APP) "UBER," THE SOCIAL COMMERCE
"GROUPON," AND SO ON.

ON FIRST BEFOREHAND, ALIBABA WHICH IS THE LARGEST E-COMMERCE COMPANY
IN CHINA ANNOUNCED PREPARATION FOR FINGERPRINT RECOGNITION PAYMENT SYSTEM
THROUGH ITS OFFICIAL BLOG. THE FINGERPRINT RECOGNITION PAYMENT SYSTEM OF
"ALIPAY" WHICH IS THE E-PURSE APPLICATION OF ALIBABA IS EXPECTED TO BE
INSTALLED IN THE NEW SMART PHONE "ASCEND MATE7" TO BE RELEASED BY HUAWEI
AT THE END OF THE YEAR.
A TOUCH-TYPE FINGERPRINT RECOGNITION MODULE USED IN HUAWEI'S
NEW SMART PHONE IS SUPPLIED BY CRUCIALTEC, KOREAN SMALL COMPANY,
AND A FINGERPRINT RECOGNITION SENSOR IS SUPPLIED BY FINGERPRINT CARDS,
SWEDISH BIOMETRIC RECOGNITION TECHNOLOGY COMPANY.

SYNAPTICS, A TOUCH SENOR CHIP MAKER, MENTIONED IRIS RECOGNITION TECHNOLOGY
AS THE MOST NOTICEABLE TECHNOLOGY IN THE MOBILE PAYMENT MARKET FROM NOW.
SYNAPTICS IS CURRENTLY SUPPLYING FINGERPRINT READERS
FOR SAMSUNG GALAXY SMART PHONES, HTC ONES, AND SO ON.

BIOMETRIC RECOGNITION TECHNOLOGY INCLUDING THE FINGERPRINT RECOGNITION
TECHNOLOGY IS RAPID AND CONVENIENT BECAUSE A USER NEEDS NOT INPUT
A PAYMENT PASSOWRD TO PAY FOR GOODS. ALIBABA SAID "FINGERPRINT OR
IRIS RECOGNITION TECHNOLOGY PROVIDES HIGHER SECURITY AND CONVENIENCE
THAN EXISTING MEANS FOR AUTHENTICATION DUE TO USE OF
UNIQUE PHYSICAL INFORMATION." AND ADDED "THIS FIELD IS OBSERVED
BY THE GOVERNMENT, CREDIT CARD COMPANIES, CELLULAR PHONE MANUFACTURERS,
AND SO ON."

| INDEX UNITS | INDEX EXAMPLES |
|---|---|
| MORPHEMES | 앞서, 1일, 중국, 최대, 전자상거래업체,... |
| ENTITY NAMES | 중국, 알리바바, 회사, 블로그, 시스템,... |
| PHRASES | 앞서 1일 중국 최대 전자상거래업체 알리바바 |
| ... | ... |
| SYNTAX STRUCTURES | 알리바바/지문인식 경제 시스템/준비하다 |
| SEMANTIC STRUCTURES | organization/utility/launch |
| ... | ... |

FIG. 7

| | |
|---|---|
| WHO IS THE ADMIRAL BORN IN HANSEONG AND HAVING PASSED THE MILITARY EXAMINATION IN THE MIDDLE PERIOD OF THE JOSEON DYNASTY? | SEARCH |

| SEARCH RESULTS OF "OCCUPATION" | CORRECT ANSWER |
|---|---|
| SUNSIN YI WAS BORN IN A CIVIL SERVANT'S FAMILY, PASSED THE MILITARY EXAMINATION IN 1576 (THE 9TH YEAR OF KING SEONJO'S REIGN), AND EARNED THE TITLES "DONGGUBIBO GWONGWAN," "HUNRYEONWON BONGSA," "BALPOJIN SUGUNMANHO" "JEONRAJWADO SUGUNJEOLDOSA," AND "JEONGHYEONDAEBU SAMDOSUGUNTONGJESA." | SUNSIN YI |
| AS AN ADMIRAL, HE BECAME SAMDOSUGUNTONGJESA OF JOSEON AND WON BATTLE AFTER BATTLE AGAINST THE JAPANESE NAVY WITH HIS OUTSTANDING LEADERSHIP OVER HIS MEN, UNSURPASSED RESOURCEFULNESS, WINNING STRATEGIES, AND BRILLIANT TACTICS. ACCORDINGLY, HE IS ADMIRED AS GREAT ADMIRAL SUNSIN YI. | SUNSIN YI |

...

| SEARCH RESULTS OF "BIRTH" | CORRECT ANSWER |
|---|---|
| SUNSIN YI(李舜臣, APRIL 28 [1] (THE EIGHTH DAY OF THE FOURTH MONTH OF THE LUNAR CALENDAR), 1545 (THE FIRST YEAR OF KING INJONG'S REIGN) ~ DECEMBER 16 (THE 19TH DAY OF THE 11TH MONTH OF THE LUNAR CALENDAR), 1598 (THE 31ST YEAR OF KING SEONJO'S REIGN)) IS A NAVAL OFFICER IN THE MIDDLE PERIOD OF THE JOSEON DYNASTY. | SUNSIN YI |
| HIS ORIGIN IS DEOKSU, COURTESY NAME IS YEOHAE, POSTHUMOUS NAME IS CHUNGMU, AND HE WAS BORN IN HANSEONG. | NO CORRECT ANSWER |

...

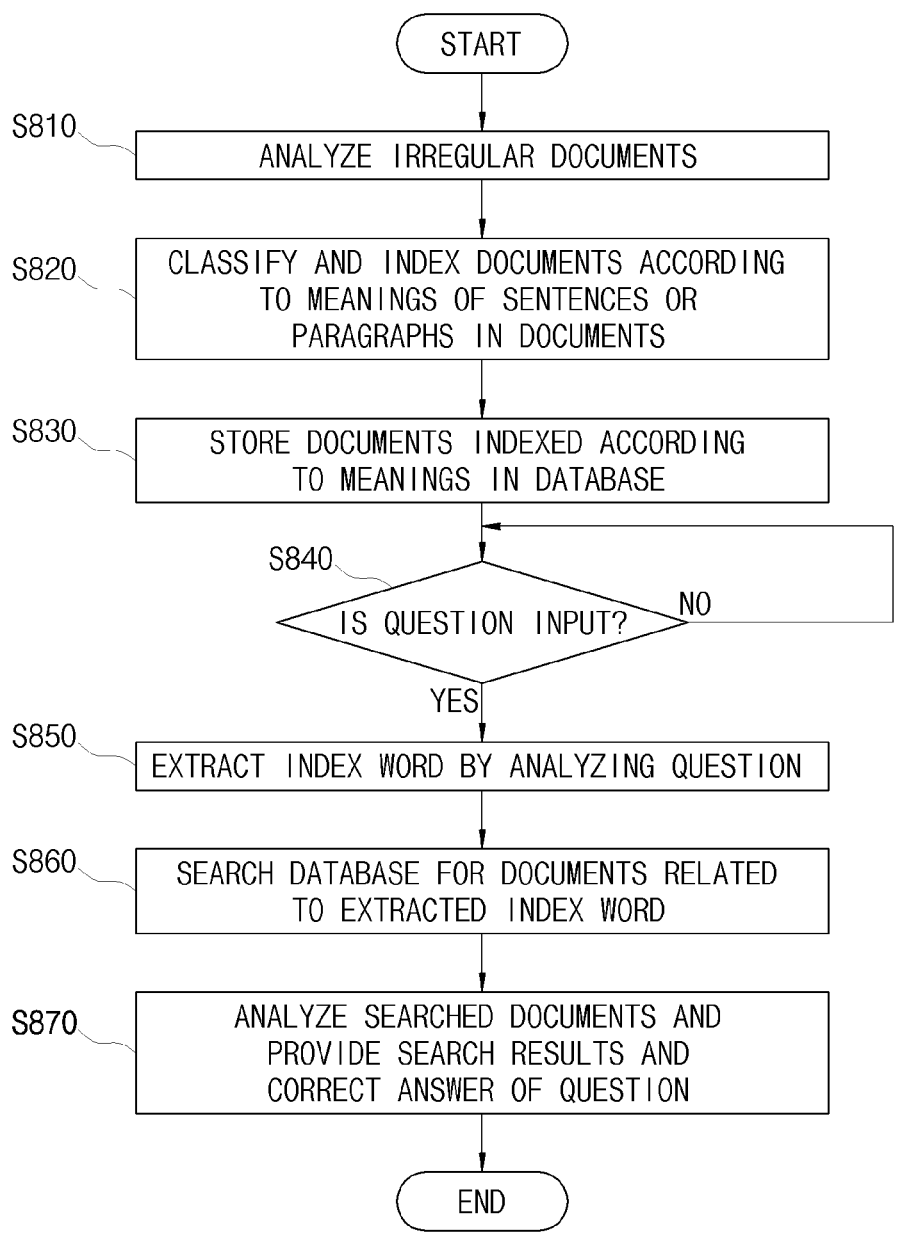

SYSTEM AND METHOD FOR ANSWERING NATURAL LANGUAGE QUESTION

CROSS-REFERENCE TO RELATED APPLICATION

This application claims priority to and the benefit of Korean Patent Application No. 10-2014-0161904, filed on Nov. 19, 2014, the disclosure of which is incorporated herein by reference in its entirety.

BACKGROUND

1. Field of the Invention

The present invention relates to a system and method for answering a natural language question, and more particularly, to a system and method for answering a natural language question in which sentences or paragraphs of irregular documents are analyzed and the documents are classified and indexed according to meanings and used to provide an answer to a question, so that information retrieval performance can be improved.

2. Discussion of Related Art

Recently, an information retrieval system for processing information on countless web documents on websites, extracting only information corresponding to a user's request, and providing the extracted information to the user is widely being used.

However, in general, it is very difficult to accurately extract documents wanted by an information requester from a huge set of web documents and obtain an accurate answer to a specific question.

For this reason, unlike an existing search system which searches for documents having matched words, a natural language question-answer search system which understands a user's intention to recommend appropriate documents and a correct answer has emerged.

In general, a question-answering system provides a correct answer as a result of a question. Most question-answering systems search documents or paragraphs first and extract a correct answer from the searched documents or paragraphs. Here, to search documents or paragraphs and extract a correct answer, results of linguistic analysis, such as morpheme analysis and syntax analysis, are used.

However, there are still many errors in linguistic analysis results, and there is no way other than using such linguistic analysis results to extract a correct answer. Therefore, the overall performance of a question-answering system is rather low.

A previously proposed method of building a question-answering information retrieval engine for a natural language in Korean on the Internet discloses an Internet information retrieval method of showing a user secondary and tertiary re-query text using a database in which user questions in the form of the natural language are accumulated to let the user select a result corresponding to query text.

Also, "Question-answering system for extracting a correct answer using a syntax structure (reference literature: Daeyoen Lee and Yeonghun Seo, The 15th Annual Conference on Human and Cognitive Language Technology, pp. 89 to 94, 2003)" discloses a question-answering system which uses a query language extension and correct answer extraction technique centering on a verb included in a question. Conjugation of verbs uses information of a constructed verb syntax dictionary, and a noun semantic dictionary is used to eliminate the vagueness of verbs.

In a knowledge-based question answering system for acquisition of concept word (reference literature: Jaehong Lee, Hoseop Choi, and Cheolyeong Ock, The 15th Annual Conference on Human and Cognitive Language Technology, pp. 95 to 100, 2003), a statistic-based knowledge base using a hybrid method and a lexicon-classification-based knowledge base are efficiently constructed centering on a Korean dictionary, an encyclopedia, etc. in which knowledge of the real world is systematically defined to some degree, and used.

Such research for existing Korean question-answering systems has a model for extracting a correct answer using a keyword and syntax structure information. However, due to the low reliability of linguistic analysis results, the overall performance of the question-answering systems is low.

In addition, according to existing general information search methods, original text having information similar to a question is searched, or results obtained by structurally dividing a document and searching the divided document are provided.

However, in a natural language question-answering system, unnecessarily provided retrieval results may be misused and cause degradation of the overall performance of the system. This also results from misunderstanding of the point of a question and information requested by the question.

Therefore, it is necessary to research a method for providing an accurate answer without causing such performance degradation of a question-answering system.

SUMMARY OF THE INVENTION

The present invention relates to a system and method for answering a natural language question, and is directed to providing a system and method for answering a natural language question in which sentences or paragraphs of irregular documents are analyzed and the documents are classified and indexed according to meanings and used to provide an answer to a question, so that information retrieval performance can be improved.

According to an aspect of the present invention, there is provided a system for answering a natural language question, the system including: an index unit configured to analyze text of previously stored irregular documents and classify and index the irregular documents according to meanings of sentences or paragraphs; a database configured to store the irregular documents indexed according to the meanings by the index unit; a retrieval unit configured to extract an index word by semantically analyzing an input question, and search the database for documents related to the extracted index word; and a provision unit configured to generate a correct answer to the question by analyzing the documents searched by the retrieval unit, and provide results of the search and the generated correct answer.

The database may include a plurality of index databases classified according to indices.

The retrieval unit may search for documents in an index database corresponding to the index word among the plurality of index databases.

The retrieval unit may extract a plurality of index words by analyzing the question.

The retrieval unit may search for documents in respective index databases corresponding to the plurality of index words.

The index unit may include: a document analyzer configured to analyze the text of the previously stored irregular documents; a semantic classifier configured to receive the text analyzed by the document analyzer and classify the meanings of the received text in units of sentences or paragraphs; and a document indexer configured to index sentences or paragraphs classified by the semantic classifier according to the meanings.

The document analyzer may perform morpheme analysis, lexical analysis, syntax analysis, and sentence structure analysis on the text.

The semantic classifier may classify the meanings by extracting sentence features and generating patterns or by using a machine learning technique.

The document indexer may index the sentences or the paragraphs in units of morphemes, entity names, phrases, syntax structures, semantic structures, sentence structures, "subject-verb" structures, "object-verb" structures, and "subject-verb-object" structures.

The retrieval unit may include: a question input portion configured to receive the question from an outside of the system; a question analyzer configured to analyze the question input through the question input portion; a question classifier configured to receive the question analyzed by the question analyzer, classify a meaning, and extract the index word; and a document search portion configured to search the database for documents related to the index word extracted by the question classifier.

When the database is searched with a plurality of index words, the provision unit may provide results of the search according to weights previously given to the respective index words.

According to another aspect of the present invention, there is provided a method of answering a natural language question, the method including: analyzing previously stored irregular documents, and classifying and indexing the irregular documents according to meanings of sentences or paragraphs in the irregular documents; transmitting the irregular documents indexed according to the meanings to a database and storing the indexed irregular documents in the database; when a question is input, analyzing the question to extract an index word, and searching the database for documents related to the extracted index word; and analyzing the searched documents to generate a correct answer to the question, and providing results of the search and the generated correct answer.

The sentences or the paragraphs in the irregular documents may be classified based on structural information or results of understanding a natural language.

The classifying and the indexing of the irregular documents may include: analyzing text of the previously stored irregular documents; receiving the analyzed text and classifying the meanings of the received text in units of sentences or paragraphs; and indexing the sentences or the paragraphs classified according to the meanings.

The classifying and the indexing of the irregular documents may include classifying one sentence or paragraph in the documents into two or more meanings.

The indexing of the sentences or the paragraphs classified according to the meanings may include indexing the sentences or the paragraphs in units of morphemes, entity names, phrases, syntax structures, semantic structures, "subject-verb" structures, "object-verb" structures, and "subject-verb-object" structures.

The analyzing of the text of the previously stored irregular documents may include performing morpheme analysis, lexical analysis, syntax analysis, and sentence structure analysis on the text.

The searching of the database for documents related to the extracted index word may include searching for documents in an index database corresponding to the index word among a plurality of index databases classified according to indices.

The classifying of the meanings of the received text in units of sentences or paragraphs may include classifying the meanings by extracting sentence features and generating patterns or by using a machine learning technique.

The providing of the results of the search and the generated correct answer may include, when the database is searched with a plurality of index words, providing results of the search according to weights previously given to the respective index words.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIGS. 3A to 3C is a diagram showing an example of results of analyzing text of a document by a document analyzer shown in FIG. 2;

FIG. 4 is a diagram showing an example of paragraphs into which a semantic classifier shown in FIG. 2 according to an exemplary embodiment of the present invention structurally divides a news document;

FIG. 5 is a diagram showing an example of an index-target sentence indexed according to index units by a document indexer shown in FIG. 2 according to an exemplary embodiment of the present invention;

FIG. 7 is a diagram showing an example of a screen provided by a provision unit shown in FIG. 1; and FIG. 8 is an operational flowchart illustrating a method of answering a natural language question according to an exemplary embodiment of the present invention.

DETAILED DESCRIPTION OF EXEMPLARY EMBODIMENTS

Figure 1:
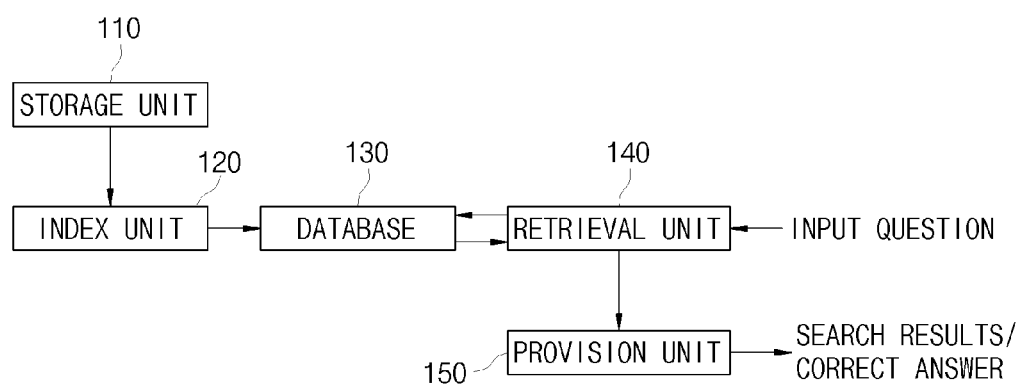
FIG. 1 is a block diagram of a system for answering a natural language question according to an exemplary embodiment of the present invention.

Advantages and features of the present invention and a method of achieving the same will be more clearly understood from embodiments described below in detail with reference to the accompanying drawings. However, the present invention is not limited to the following embodiments and may be implemented in various different forms. The embodiments are provided merely for complete disclosure of the present invention and to fully convey the scope of the invention to those of ordinary skill in the art to which the present invention pertains. The present invention is defined only by the scope of the claims. Throughout the specification, like reference numerals refer to like elements.

In describing the present invention, any detailed description of related art of the invention will be omitted if it is deemed that such a description will obscure the gist of the invention unintentionally. In addition, terms used below are defined in consideration of functions in the present invention, which may be changed according to the intention of a user or an operator, or a practice, etc. Therefore, the definitions of these terms should be made based on the overall description of this specification.

Hereinafter, a system and method for answering a natural language question according to exemplary embodiments of the present invention will be described in detail with reference to the accompanying drawings.

FIG. 1 is a block diagram of a system for answering a natural language question according to an exemplary embodiment of the present invention.

Referring to FIG. 1, a system for answering a natural language question according to an exemplary embodiment of the present invention may include a storage unit 110, an index unit 120, a database 130, a retrieval unit 140, and a provision unit 150.

The storage unit 110 stores various kinds of irregular data in the form of documents, and the irregular data stored in the storage unit 110 may be acquired via various routes in the World Wide Web. Here, the irregular data denotes a large amount of data collected from various channels, such as news, research papers, patents, dictionaries, blogs, online forums, and Facebook.

The index unit 120 analyzes text of the irregular documents stored in the storage unit 110, and classifies and indexes the irregular documents according to meanings of sentences or paragraphs. At this time, the index unit 120 transmits the irregular documents indexed according to the meanings to the database 130.

The database 130 receives and stores the irregular documents indexed according to the meanings and transmitted from the index unit 120. Here, it is preferable for a plurality of irregular documents to be grouped according to indices and stored in the database 130, and it is preferable for the database 130 to be divided so that the grouped irregular documents may be adjacently stored in a predetermined region.

Therefore, the database 130 may include a plurality of index databases classified according to indices.

The retrieval unit 140 extracts an index word by semantically analyzing an input question, and searches the database 130 for documents related to the extracted index word.

When searching the database 130 for documents, the retrieval unit 140 searches for documents in an index database corresponding to the index word among the plurality of index databases classified according to indices rather than in all regions of the database 130.

The retrieval unit 140 may extract a plurality of index words by analyzing the input question. In this case, the retrieval unit 140 searches for documents in respective index databases corresponding to the respective index words.

The provision unit 150 generates a correct answer to the question by analyzing documents searched by the retrieval unit 140, and provides the search results and the correct answer.

Figure 2:
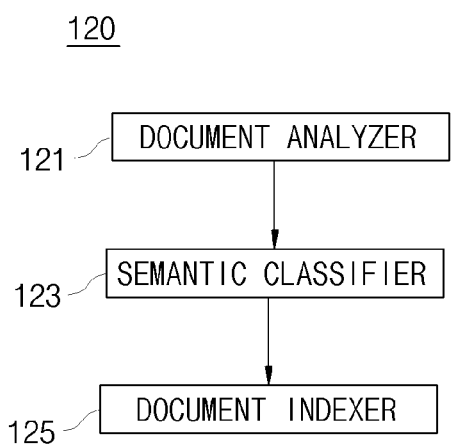
FIG. 2 is detailed block diagram of an index unit shown in FIG. 1.

FIG. 2 is detailed block diagram of an index unit in the system for answering a natural language question shown in FIG. 1 according to an exemplary embodiment of the present invention.

Referring to FIG. 2, the index unit 120 of the system for answering a natural language question according to an exemplary embodiment of the present invention analyzes the text of irregular documents stored in the storage unit 110 shown in FIG. 1, and classifies and indexes the irregular documents according to meanings of sentences or paragraphs.

As shown in FIG. 2, the index unit 120 may include a document analyzer 121, a semantic classifier 123, and a document indexer 125.

The document analyzer 121 analyzes the text of the irregular documents stored in the storage unit 110.

FIGS. 3A to 3C is a diagram showing an example of results of analyzing text of a document by the document analyzer 121. As shown in FIGS. 3A to 3C, the document analyzer 121 performs morpheme analysis, lexical analysis such as recognition of entity names, syntax analysis, and sentence structure analysis to apply various index units.

Text which is analyzed in depth by the document analyzer 121 is subsequently used in a semantic classification operation as well as a document index operation.

The semantic classifier 123 receives the text analyzed by the document analyzer 121 and classifies meanings of the received text. At this time, the semantic classifier 123 classifies the received text in units of sentences or paragraphs. In other words, the semantic classifier 123 receives the text from the document analyzer 121 and classifies the text in units of sentences or paragraphs according to meanings.

Meanwhile, FIG. 4 is a diagram showing an example of structurally divided paragraphs of a news document. As shown in FIG. 4, sentences or paragraphs are divided based on structure information of a document or results of understanding a natural language.

The semantic classifier 123 may classify the text in various categories according to a system request. For example, the text may be classified by work, evaluation, constitution, reason, effect, character, background of growth, and so on.

Also, the semantic classifier 123 may classify the text by extracting sentence features and generating patterns or by using a machine learning technique.

In addition, the semantic classifier 123 may classify one sentence or paragraph into two or more meanings.

For example, the semantic classifier 123 may classify an example sentence "Sunsin Yi was born in Hanseong and passed the military examination in the middle period of the Joseon Dynasty" into two meanings "occupation" and "birth."

In this way, when the semantic classifier 123 classifies a classification target into two or more meanings, weights may be given to the respective meanings.

In other words, when the semantic classifier 123 classifies the example sentence into the two meanings "occupation" and "birth," weights of 0.7 and 0.3 may be given to "occupation" and "birth," respectively.

When a classification target is classified into two or more meanings, it is possible to increase the accuracy rate of a search result by giving weights to the respective meanings.

The document indexer 125 indexes documents in units of sentences or paragraphs classified according to meanings by the semantic classifier 123.

At this time, the document indexer 125 may index the documents in units of morphemes, entity names, phrases, syntax structures, and semantic structures, and may analyze sentence structures and perform indexing in units of 2-tuples (subject-verb and object-verb) and 3-tuples (subject-verb-object).

FIG. 5 shows an example of an index-target sentence indexed according to index units in which "앞서 1일 중국 최대 전자상거래 업체 알리바바는 회사 공식 블로그를 통해 지 문인식 경제 시스 템을 준비하고 있 다고 밝혔다" is used as the index-target sentence.

The index-target sentence of FIG. 5 includes the syntax structure "Subject(알리바바는 )-Object(지문인식 경제 시스 템을 )-Verb(준비한다 )."

However, another sentence may represent the same meaning in another document. For example, the other sentence may be "Subject(알리바바는 )-Object(지문인식 경제 시스템을 )-Verb(착수하다 )."

Since the two sentences have the same meaning but different ways of expression, they are recognized and indexed as sentences having different meanings in the related art.

To solve this problem, in an exemplary embodiment of the present invention, indexing is performed up to semantic structure units of sentences, and index databases are generated according to semantic classification of the sentences.

Figure 6:
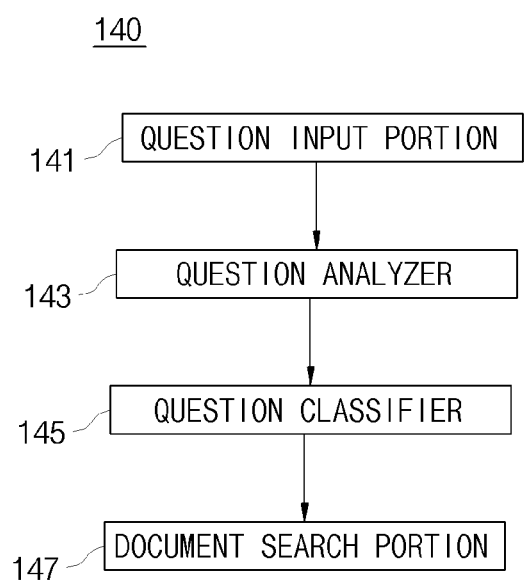
FIG. 6 is detailed block diagram of a retrieval unit of the system for answering a natural language question shown in FIG. 1 according to an exemplary embodiment of the present invention.

FIG. 6 is detailed block diagram of the retrieval unit 140 of the system for answering a natural language question according to an exemplary embodiment of the present invention.

Referring to FIG. 6, the retrieval unit 140 of the system for answering a natural language question according to an exemplary embodiment of the present invention extracts an index word by semantically analyzing an input question, and searches the database 130 for documents having the extracted index word.

Here, the retrieval unit 140 may include a question input portion 141, a question analyzer 143, a question classifier 145, and a document search portion 147.

The question input portion 141 is configured to receive a question from the outside of the system. For example, the question input portion 141 may be a keyboard, a touchpad, etc., but is not limited thereto.

The question analyzer 143 analyzes the question input through the question input portion 141. At this time, the question analyzer 143 performs morpheme analysis, lexical analysis such as recognition of entity names, syntax analysis, and sentence structure analysis to apply various index units.

The question classifier 145 receives the question analyzed by the question analyzer 143, classifies a meaning of the question, and extracts an index word. At this time, the question classifier 145 classifies the received question in units of sentences or paragraphs, and two or more index words may be extracted by the question classifier 145.

The document search portion 147 searches the database 130 for documents related to the index word extracted by the question classifier 145.

When searching the database 130 for documents, the document search portion 147 searches for documents in an index database corresponding to the index word among a plurality of index databases classified according to indices rather than in all regions of the database 130.

When a plurality of index words are extracted by the question classifier 145, the document search portion 147 searches for documents in respective index databases corresponding to the respective index words.

The provision unit 150 generates a correct answer to the question by analyzing documents searched by the retrieval unit 140, and provides the search results and the correct answer.

At this time, the provision unit 150 analyzes the number of index words with which documents have been searched, the weight of each index word when documents have been searched with a plurality of index words, a document appropriate for a result of the question, and so on.

When documents are searched with a plurality of index words, the provision unit 150 determines the weights of the respective index words and provides search results according to the weights.

Also, when documents are searched with a plurality of index words and the weights of the respective index words are determined, if any one weight is too small (e.g., 0.1), search results based on an index word having the small weight may not be provided to increase importance of index words having large weights.

FIG. 7 is a diagram showing an example of a screen provided by a provision unit according to an exemplary embodiment of the present invention.

Referring to FIG. 7, search results and a correct answer of the question "Who is the admiral born in Hanseong and having passed the military examination in the middle period of the Joseon Dynasty?" are provided. At this time, search results and correct answers of two index words "occupation" and "birth," which are extracted from the question "Who is the admiral born in Hanseong and having passed the military examination in the middle period of the Joseon Dynasty?," are provided.

Here, when the weight of the index word "occupation" is 0.6 and the weight of the index word "birth" is 0.4, the provision unit 150 may provide 60% of search results obtained from an occupation index database and 40% of search results obtained from a birth index database as search results.

Also, when the weight of the index word "occupation" is 0.9 and the weight of the index word "birth" is 0.1, the provision unit 150 may not provide search results obtained from the birth index database and may provide only search results obtained from the occupation index database.

Thus far, a detailed configuration and functions of the system for answering a natural language question according to an exemplary embodiment of the present invention have been described. A method of answering a natural language question according to an exemplary embodiment of the present invention will be described in stages below.

FIG. 8 is an operational flowchart illustrating a method of answering a natural language question according to an exemplary embodiment of the present invention.

Referring to FIGS. 1 and 8, the index unit 120 analyzes the text of irregular documents stored in the storage unit 110 (S810), and classifies and indexes the documents according to meanings of sentences or paragraphs in the documents (S820).

Meanwhile, although not shown in the drawing, a process of storing various kinds of irregular documents in the storage unit 110 may be further performed. The process of storing irregular documents in the storage unit 110 may include a process of acquiring information from various channels in the World Wide Web.

In operation S810, morpheme analysis, lexical analysis, syntax analysis, and sentence structure analysis may be performed on the documents, and the documents may be classified by extracting sentence features and generating patterns or by using a machine learning technique.

In operation S820, the sentences or the paragraphs in the documents may be classified based on structural information or results of understanding a natural language.

Also, in operation S820, one sentence or paragraph may be classified into two or more meanings.

Meanwhile, in operation S820, the documents may be indexed in units of morphemes, entity names, phrases, syntax structures, and semantic structures. In addition, the documents may also be indexed in units of 2-tuple structures, such as "subject-verb" and "object-verb" and 3-tuple structures, such as "subject-verb-object."

After indexing the irregular documents in operation S820, the index unit 120 transmits the documents indexed according to meanings to the database 130 and stores the indexed documents in the database 130 (S830).

When the documents are stored in the database 130 in operation S830, it is preferable to divide the database 130 into a plurality of index databases and store the documents indexed according to meanings in the corresponding index databases.

When the documents to be searched to answer a question are stored in the database 130 in operation S830, the retrieval unit 140 continuously determines whether a question is input (S840).

When it is determined in operation S840 that a question is input (S840—Yes), the retrieval unit 140 extracts an index word by analyzing the question (S850), and searches the database 130 for documents related to the extracted index word (S860).

In operation S850, morpheme analysis, lexical analysis, syntax analysis, and sentence structure analysis are performed on the question.

In operation S860, the retrieval unit 140 searches for documents in an index database corresponding to the index word among the plurality of index databases divided according to indices.

Meanwhile, in operation S850, a plurality of index words may be extracted. In this case, in operation S860, documents are searched in index databases corresponding to the respective extracted index words.

When documents are searched in operation S860, the provision unit 150 analyzes the documents searched in operation S860 and provides the search results and a correct answer of the question (S870).

According to exemplary embodiments of the present invention, when documents are searched and indexed, semantically classified paragraphs or sentences are used as search targets instead of whole original documents. When these semantically classified paragraphs or sentences are used, semantically related sentences or paragraphs are searched instead of whole documents, so that users can find desired information with little effort.

In addition, a currently used search service provides a user with all documents which can be searched for using one search question, and thus the user is required to find desired information in the search results. However, in exemplary embodiments of the present invention, it is analyzed what kind of information a user wants to obtain from a question, and only information wanted by the user is provided.

Further, unlike related art, questions and search targets are classified into semantic paragraphs and then indexed, and a user is provided with a document including a correct answer as well as the correct answer, so that the correct answer can be highly trusted by the user.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A system for answering a natural language question, the system comprising:
one or more processors that process computer executable program code embodied in non-transitory computer readable storage media,
wherein when the program code is executed by computer the program code causes the processor to perform the steps of:
analyzing text of irregular documents stored in a storage unit, classifying and indexing the irregular documents according to meanings of sentences or paragraphs, and stores in a database the irregular documents indexed according to the meanings by the index unit, wherein the sentences or the paragraphs in the irregular documents are classified based on structural information or results of understanding a natural language;
extracting an index word by semantically analyzing an input question, and searches the database for documents related to the extracted index word; and
generating a correct answer to the question by analyzing the documents searched by the retrieval unit, and provides results of the search and the generated correct answer,
wherein analyzing the text of the stored irregular documents comprises analyzing by a document analyzer the text of the stored irregular documents;
wherein the classifying comprises receiving by a semantic analyzer text analyzed by the document analyzer and classifying the meanings of the received text in units of sentences or paragraphs by a semantic classifier; and
wherein the indexing comprises indexing by a document indexer sentences or paragraphs classified by the semantic classifier according to the meanings in units of morphemes, entity names, phrases, syntax structures, semantic structures, sentence structures, "subject-verb" structures, "object-verb" structures, and "subject-verb-object" structures.

2. The system of claim 1, wherein the database comprises a plurality of index databases classified according to indices.

3. The system of claim 2, wherein the processor searches for documents in an index database corresponding to the index word among the plurality of index databases.

4. The system of claim 2, wherein the processor extracts a plurality of index words by analyzing the question.

5. The system of claim 4, wherein the processor searches for documents in respective index databases corresponding to the plurality of index words.

6. The system of claim 1, wherein the processor performs morpheme analysis, lexical analysis, syntax analysis, and sentence structure analysis on the text.

7. The system of claim 1, wherein the processor classifies the meanings by extracting sentence features and generating patterns or by using a machine learning technique.

8. The system of claim 1, wherein the processor receives the question from an outside of the system;
analyzes the question input through the question input portion;
receives the question analyzed by the question analyzer, classifying a meaning, and extracts the index word; and
searches the database for documents related to the index word extracted by the question classifier.

9. The system of claim 1, wherein, when the database is searched with a plurality of index words, the processor provides results of the search according to weights previously given to the respective index words.

10. A method of answering a natural language question, the method comprising:
processing computer executable program code embodied in non-transitory computer readable storage media by one or more processors, the processing comprising:
analyzing previously stored irregular documents, and classifying and indexing the irregular documents according to meanings of sentences or paragraphs in the irregular documents, wherein the sentences or the paragraphs in the irregular documents are classified based on structural information or results of understanding a natural language;

transmitting the irregular documents indexed according to the meanings to a database and storing the indexed irregular documents in the database;

when a question is input, analyzing the question to extract an index word and searching the database for documents related to the extracted index word; and analyzing the searched documents to generate a correct answer to the question, and providing results of the search and the generated correct answer, wherein the classifying and indexing the irregular documents comprises:

analyzing by a document analyzer text of the previously stored irregular documents;

receiving by a semantic classifier the analyzed text and classifying the meanings of the received text in units of sentences or paragraphs; and indexing by a document indexer the sentences or the paragraphs classified according to the meanings in units of morphemes, entity names, phrases, syntax structures, semantic structures, "subject-verb" structures, "object-verb" structures, and "subject-verb-object" structures.

11. The method of claim 10, wherein the sentences or paragraphs in the irregular documents are classified based on structural information or results of understanding a natural language.

12. The method of claim 10, wherein the classifying and indexing the irregular documents comprises classifying one sentence or paragraph in the documents into two or more meanings.

13. The method of claim 10, wherein the analyzing the text of the previously stored irregular documents comprises morpheme analysis, lexical analysis, syntax analysis, and sentence structure analysis on the text.

14. The method of claim 10, wherein the searching the database for documents related to the extracted index word comprises searching for documents in an index database corresponding to the index word among a plurality of index databases classified according to indices.

15. The method of claim 10, wherein the classifying the meanings of the received text in units of sentences or paragraphs comprises classifying the meanings by extracting sentence features and generating patterns or using a machine learning technique.

16. The method of claim 10, wherein the providing the results of the search and the generated correct answer comprises, when the database is searched with a plurality of index words, comprises providing results of the search according to weights previously given to the respective index words.

\* \* \* \* \*